US008155511B2

(12) United States Patent
Maki

(10) Patent No.: US 8,155,511 B2
(45) Date of Patent: Apr. 10, 2012

(54) CAMERA SYSTEM AND METHOD FOR CONTROLLING THE SAME

(75) Inventor: Takashi Maki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/938,678

(22) Filed: Nov. 3, 2010

(65) Prior Publication Data

US 2011/0110654 A1 May 12, 2011

(30) Foreign Application Priority Data

Nov. 9, 2009 (JP) ................................. 2009-256164
Jul. 15, 2010 (JP) ................................. 2010-160608

(51) Int. Cl.
*G03B 17/00* (2006.01)

(52) U.S. Cl. ....................................................... 396/49

(58) Field of Classification Search ...................... 396/49
See application file for complete search history.

(56) References Cited

U.S. PATENT DOCUMENTS

| 4,860,113 A * | 8/1989 | Miyamoto et al. ............ 348/187 |
| 2010/0091175 A1* | 4/2010 | Shintani et al. ............... 348/345 |
| 2010/0149361 A1* | 6/2010 | Takeuchi ..................... 348/222.1 |
| 2010/0208434 A1* | 8/2010 | Kim et al. ....................... 361/729 |
| 2010/0302411 A1* | 12/2010 | Ueda et al. ..................... 348/234 |
| 2011/0102618 A1* | 5/2011 | Yamaya ....................... 348/222.1 |
| 2011/0164164 A1* | 7/2011 | Aoki et al. ................ 348/333.01 |
| 2011/0187874 A1* | 8/2011 | Kikuchi ..................... 348/207.1 |

FOREIGN PATENT DOCUMENTS

| JP | 2005-236773 | 9/2005 |
| JP | 2006-325109 | 11/2006 |
| JP | 2010-177980 | 8/2010 |

* cited by examiner

*Primary Examiner* — Rodney Fuller
(74) *Attorney, Agent, or Firm* — Oblon, Spivak, McClelland, Maier & Neustadt, L.L.P.

(57) ABSTRACT

A camera system includes an interchangeable lens unit including an optical lens and an imaging device for taking an image of light from a subject having passed through the optical lens, a body unit to and from which the interchangeable lens unit is attachable and detachable, a setting information saving unit which is provided in each of the interchangeable lens unit and the body unit and saves part or all of pieces of setting information referred to in taking an image, a setting information choosing unit which chooses setting information to refer to, from the setting information saved in the interchangeable lens unit and the setting information saved in the body unit, and a setting information determination unit which determines whether or not the setting information saved in the body unit is applicable to the interchangeable lens unit.

15 Claims, 6 Drawing Sheets

SINGLE-FOCUS
INTERCHANGEABLE LENS UNIT

INTERCHANGEABLE LENS UNIT
WITH OPTICAL ZOOM LENS UNITS

FIG. 1
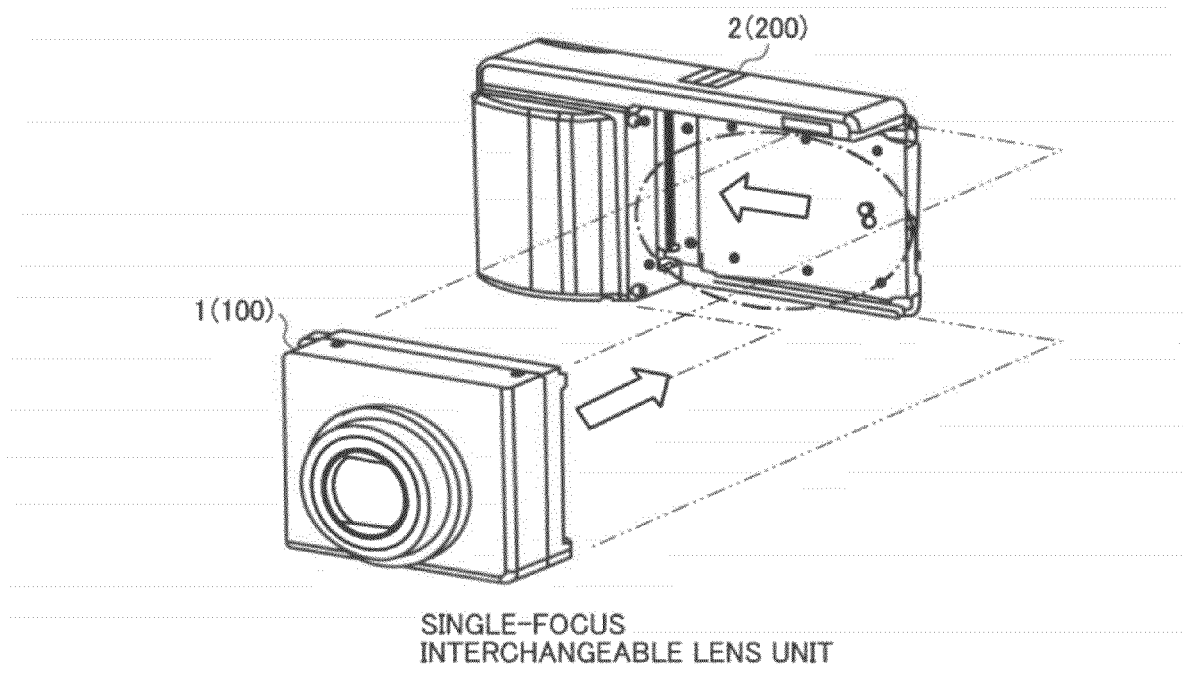
SINGLE-FOCUS
INTERCHANGEABLE LENS UNIT
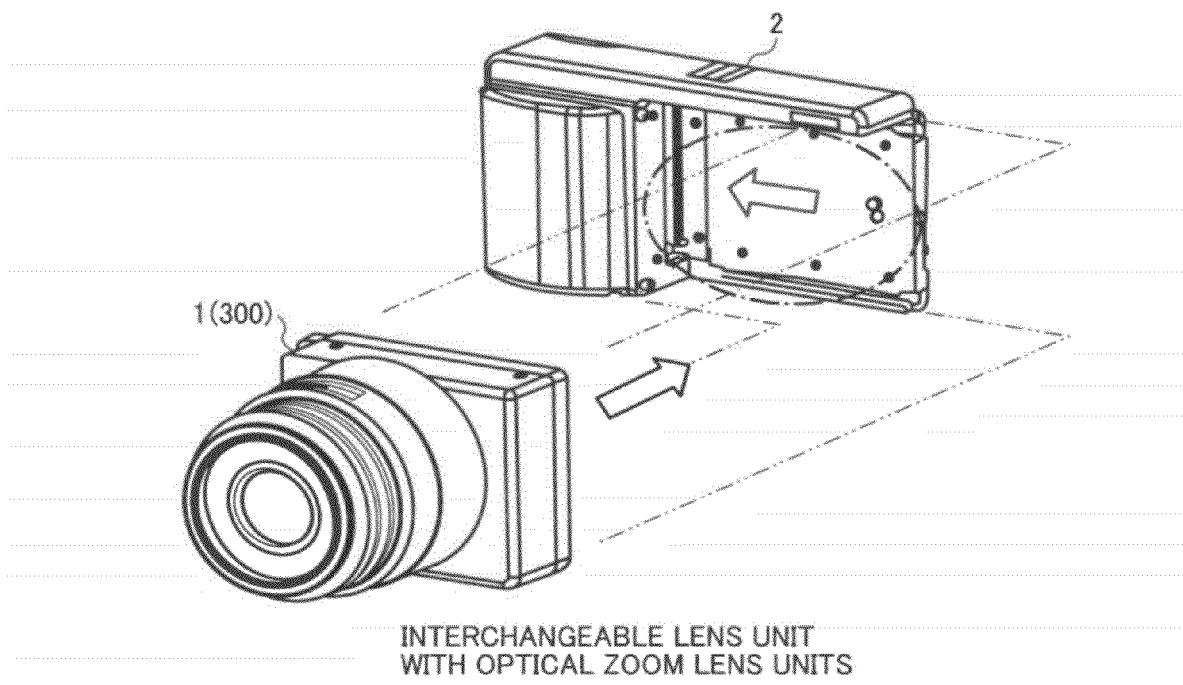
INTERCHANGEABLE LENS UNIT
WITH OPTICAL ZOOM LENS UNITS

CAMERA SYSTEM AND METHOD FOR CONTROLLING THE SAME

PRIORITY CLAIM

The present application is based on and claims priority from Japanese Patent Application No. 2009-256164, filed on, Nov. 9, 2009 and Japanese Patent Application No. 2010-160608, field on Jul. 15, 2010, the disclosures of which are hereby incorporated by references in their entirety.

BACKGROUND OF THE INVENTION

1. Field of the Invention

The present invention relates to an interchangeable-lens camera system such as a single-lens reflex digital camera or a compact digital camera, and to a method for controlling the camera system. The present invention is also applicable to an interchangeable-lens camera system such as a video camera or a mobile phone, and to a method for controlling the camera system.

2. Description of the Related Art

An interchangeable-lens digital camera of a single-lens reflex type, for example, which has an imaging device in a body unit thereof has a weakness that dust adheres to the surface of the imaging device during lens change and appears as an image on an image taken thereafter. In addition, the imaging device of such a camera is larger than that of a compact digital camera, making it difficult to reduce the camera size, and thus, such a camera is not suitable for casual shooting such as taking snapshots. On the other hand, such a camera has advantages that lens change allows use of various field angles and lens speeds and that using the large imaging device enables sensitive imaging with less big blur and noise.

Recently, a camera system no longer having the above problems but still having the above advantages has been proposed. Specifically, such a camera system includes various interchangeable lenses each having an imaging device with a size corresponding to the properties of the lens.

The above camera system having image devices with different sizes according to the lens properties, however, has problems which are not present in the conventional, interchangeable-lens digital camera of a single-lens reflex type having a single imaging device fixed inside the body of the camera.

For example, in the conventional interchangeable-lens camera system, items necessary for shooting (setting items), such as an ISO speed, a recording pixel count, a type of recorded image (JPEG or RAW data), an exposure metering scheme, and a focus drive mode, are set and saved through user operation on only the body unit of the camera system. However, in a camera system in which the imaging device is provided to the interchangeable lens, these setting items (setting information) need to be saved in both of the lens unit and the body unit.

If the interchangeable lens unit cannot save the setting information, imaging cannot be performed using setting information used in the last shooting after changing the interchangeable lens unit. For this reason, every time a new interchangeable lens unit is attached, various pieces of setting information for that interchangeable lens unit have to be set up for the new interchangeable lens unit. Japanese Patent Application Publication No. 2005-236773 discloses the following technique to address this problem. Specifically, the technique allows a destination for saving the setting information to be selected between the body unit and the interchangeable lens unit. Thereby, even when the interchangeable lens unit is detached from and then later coupled to the body unit, the interchangeable lens unit can be easily adapted to the intended use.

Depending on the purpose of using the camera, when the interchangeable lens unit is changed with another lens unit, a user may not want to use the same pieces of setting information, or, as described above, may want to use setting information different from that used for the previously-used interchangeable lens unit. The former case can be achieved by saving the setting information in the body unit. The latter case, on the other hand, requires the body unit to hold setting information different for each interchangeable lens unit, so that the body unit has to hold all the setting information corresponding to respective multiple interchangeable lens units. However, when there are many types of interchangeable lens units, it is not reasonable for the body unit to hold the setting information for a number of interchangeable lens units. This is because the number of types of interchangeable lens units may be infinite, whereas the body unit has a limited storage space. For this reason, to accomplish the purpose of saving setting information different for each interchangeable lens unit, it is desirable that the interchangeable lens units hold their corresponding setting information. Making the interchangeable lens units hold their setting information further allows multiple interchangeable lens units, even of the same type, to have setting information different according to the usage purpose and to be used according to the intended use.

In such a camera system in which interchangeable lens units each having an imaging device are attachable to and detachable from the body unit, each interchangeable lens unit performs differently depending on its type. Accordingly, there may arise the following problem when certain setting information saved in the body unit is to be used for multiple interchangeable lens units. Specifically, for example, the setting information may be applicable to an interchangeable lens unit of Type 1, but may not be applicable to an interchangeable lens unit of Type 2. To be more specific, some setting information may be applicable to (within the performance range of) the interchangeable lens unit of Type 1, but may not be applicable to (out of the performance range of) the interchangeable lens unit of Type 2. When the performance of the interchangeable lens unit attached and the setting information are incompatible, the setting of the interchangeable lens unit cannot be performed.

In some shooting situations or for some users, certain setting information should be used in common regardless of the interchangeable lens unit to attach, and certain setting information should be changed every time the interchange lens unit to attach is changed, in order to use setting information suitable for the interchangeable lens unit to use. Such a case requires a user to perform the setting of the setting information collectively, making it hard-to-use and cumbersome for the user.

As described above, the camera system in which interchangeable lens units each having an imaging device are attachable to and detachable from the body unit has specific problems in saving and reading setting information necessary for shooting.

SUMMARY OF THE INVENTION

The present invention has an objective to provide a camera system with an interchangeable lens unit having an imaging device, a method for controlling the camera system, and a body unit used in the camera system. Specifically, the camera system allows a user to perform easy-to-handle, fuss-free setting of setting information necessary for shooting even when multiple interchangeable lens units are used.

In order to achieve the above object, an embodiment of the present invention provides a camera system comprising an interchangeable lens unit including an optical lens and an imaging device for taking an image of light from a subject having passed through the optical lens, a body unit to and from which the interchangeable lens unit is attachable and detachable, a setting information saving unit which is provided in each of the interchangeable lens unit and the body unit and saves part or all of pieces of setting information referred to in taking an image, a setting information choosing unit which chooses setting information to refer to, from the setting information saved in the interchangeable lens unit and the setting information saved in the body unit, and a setting information determination unit which determines whether or not the setting information saved in the body unit is applicable to the interchangeable lens unit, wherein when the setting information choosing unit chooses the setting information saved in the body unit, if the setting information determination unit determines that the setting information saved in the body unit is not applicable to the interchangeable lens unit, the setting information saved in the body unit is set in a memory provided in the body unit by referring to an initial value of the setting information saved in the interchangeable lens unit.

An embodiment of the present invention also provides a method for controlling a camera system comprising an interchangeable lens unit including an optical lens and an imaging device for taking an image of light from a subject having passed through the optical lens, a body unit to and from which the interchangeable lens unit is attachable and detachable, a setting information saving step which is provided in each of the interchangeable lens unit and the body unit and saves part or all of pieces of setting information referred to in taking an image, a setting information choosing step which chooses setting information to refer to, from the setting information saved in the interchangeable lens unit and the setting information saved in the body unit, and a setting information determination step which determines whether or not the setting information saved in the body unit is applicable to the interchangeable lens unit, wherein when the setting information choosing step chooses the setting information saved in the body unit, if the setting information determination step determines that the setting information saved in the body unit is not applicable to the interchangeable lens step, the setting information saved in the body unit is set in a memory provided in the body unit by referring to an initial value of the setting information saved in the interchangeable lens unit.

BRIEF DESCRIPTION OF THE DRAWINGS

FIG. 1 is a schematic configuration diagram of a digital camera which is one embodiment of a camera system according to the present invention.

DESCRIPTION OF THE PREFERRED EMBODIMENT

Figure 2:
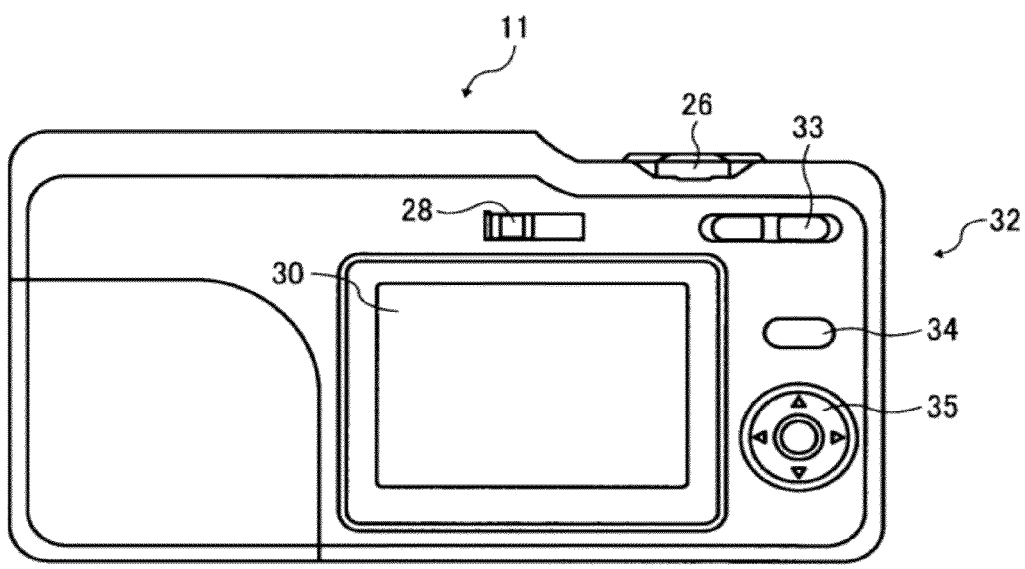
FIG. 2 is a schematic diagram illustrating a configuration of a back side of the digital camera which is one embodiment of the camera system according to the present invention.

A camera system according to an embodiment of the present invention comprises an interchangeable lens unit including an optical lens and an imaging device for taking an image of light from a subject having passed through the optical lens, a body unit to and from which the interchangeable lens unit is attachable and detachable, a setting information saving unit which is provided in each of the interchangeable lens unit and the body unit and saves part or all of pieces of setting information referred to in taking an image, a setting information choosing unit which chooses setting information to refer to, from the setting information saved in the interchangeable lens unit and the setting information saved in the body unit, and a setting information determination unit which determines whether or not the setting information saved in the body unit is applicable to the interchangeable lens unit, wherein when the setting information choosing unit chooses the setting information saved in the body unit, if the setting information determination unit determines that the setting information saved in the body unit is not applicable to the interchangeable lens unit, the setting information saved in the body unit is set in a memory provided in the body unit by referring to an initial value of the setting information saved in the interchangeable lens unit.

A method for controlling a camera system according to an embodiment of the present invention comprises an interchangeable lens unit including an optical lens and an imaging device for taking an image of light from a subject having passed through the optical lens, a body unit to and from which the interchangeable lens unit is attachable and detachable, a setting information saving step which is provided in each of the interchangeable lens unit and the body unit and saves part or all of pieces of setting information referred to in taking an image, a setting information choosing step which chooses setting information to refer to, from the setting information saved in the interchangeable lens unit and the setting information saved in the body unit, and a setting information determination step which determines whether or not the setting information saved in the body unit is applicable to the interchangeable lens unit, wherein when the setting information choosing step chooses the setting information saved in the body unit, if the setting information determination step determines that the setting information saved in the body unit is not applicable to the interchangeable lens step, the setting information saved in the body unit is set in a memory provided in the body unit by referring to an initial value of the setting information saved in the interchangeable lens unit.

Next, a camera system and a method for controlling the camera system according to the present invention will be described in further detail. Being preferable embodiments of the present invention, embodiments described below have various technically-preferable limitations. Note, however, the scope of the present invention is not limited to those modes unless it is stated in the following description that the present invention is limited thereto.

FIG. 1 is a schematic configuration diagram of a digital camera system which is one embodiment of a camera system including interchangeable lens units (1) and a body unit (2) according to the present invention. Each interchangeable lens unit (1) is attachable to and detachable from the body unit (2). As FIG. 1 shows, the interchangeable lens units (1) have several types. Type 1 of the interchangeable lens units (1) is a single-focus interchangeable lens unit (100) which is coupled to the body unit (2) attachably and detachably. Type 2 of the interchangeable lens units (1) is an interchangeable lens unit with optical zoom function (300) which is coupled to the body unit (2) attachably and detachably.

As illustrated in FIG. 2, the back side of the body unit (11) includes a power source switch (28) which turns on/off the power source of the camera system (10), a liquid crystal display panel (hereinafter, LCD) (30) which displays a shot image, a through image, various menu images and the like, and an operation section (32) which inputs various instruction signals to the camera system (10). The operation section (32) includes, for example, a zoom button (33) which changes a zoomable photographing lens (13) to a wide side or a telephoto side, a menu button (34) which is operated when selecting a menu displayed on a menu screen of the LCD (30), an arrow key (35) which moves a cursor within the menu screen, and a determination button.

First Embodiment of the Camera System

Figure 3:
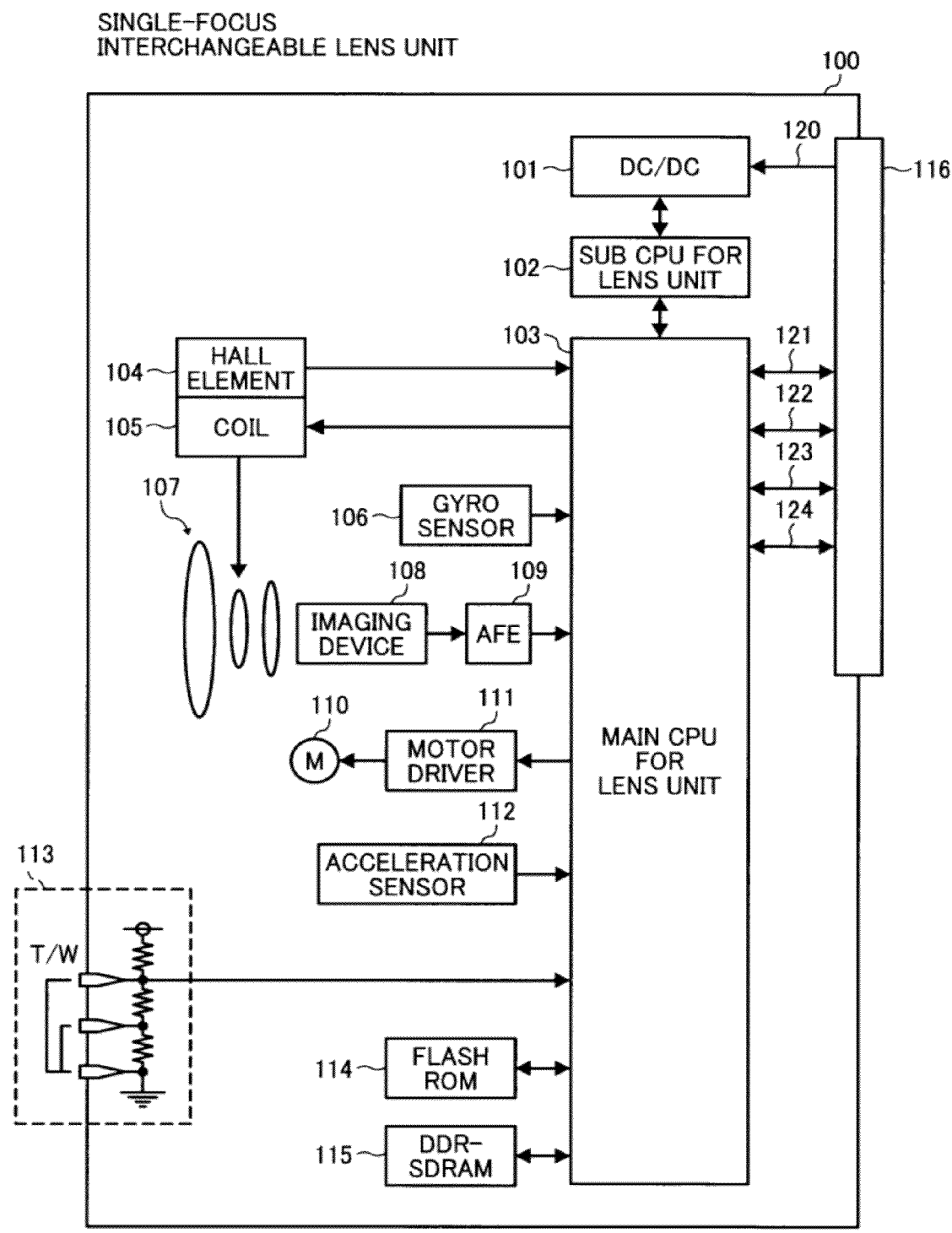
FIG. 3 is a block diagram showing the configuration of an interchangeable lens unit in a digital camera system which is a first embodiment of the camera system according to the present invention.
Figure 4:
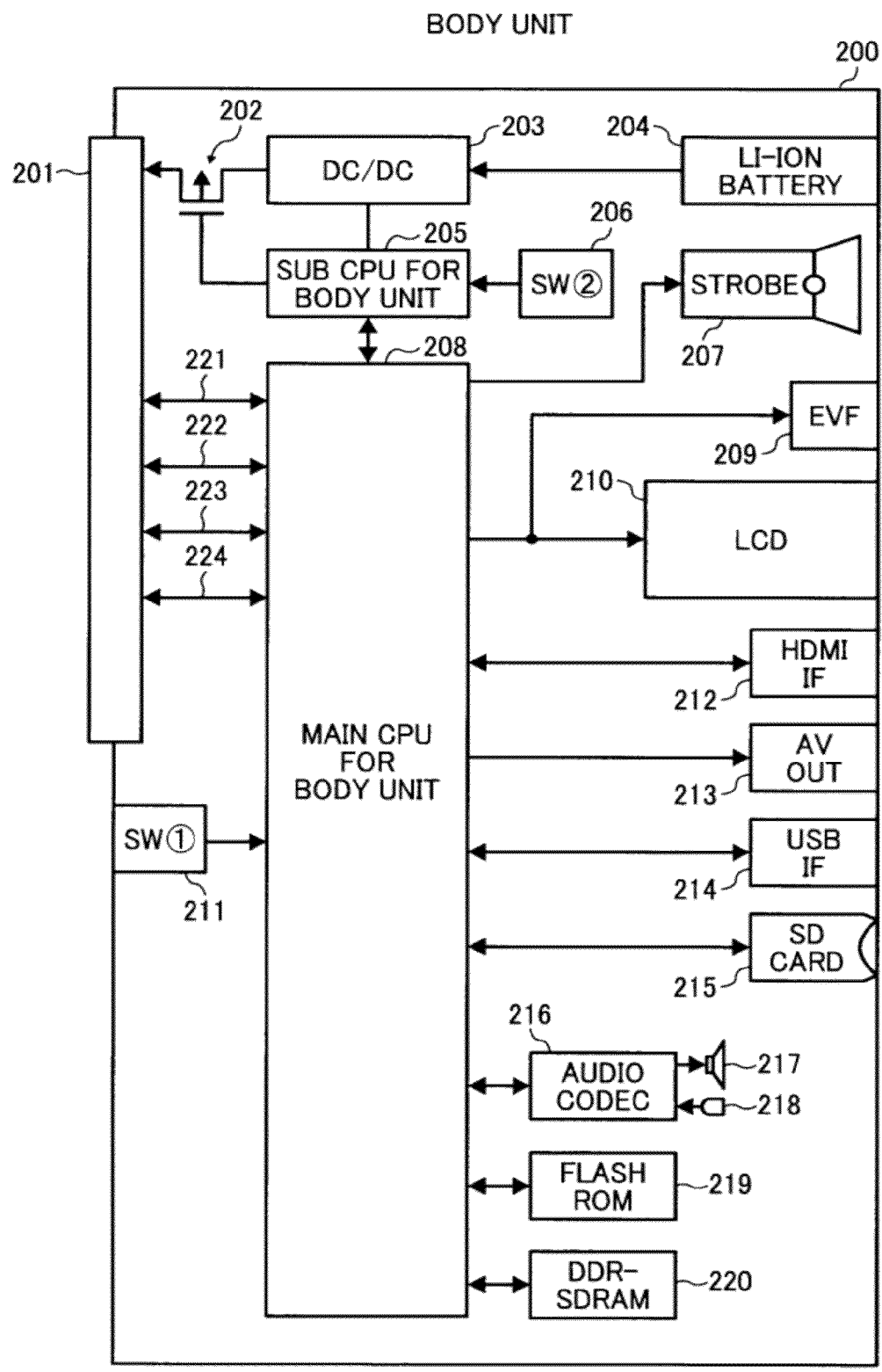
FIG. 4 is a block diagram showing the configuration of a body unit in the digital camera system which is the first embodiment of the camera system according to the present invention.

FIG. 3 is a block diagram showing the configuration of the single-focus interchangeable lens unit (100) in a digital camera system which is a first embodiment of the camera system according to the present invention. In addition, FIG. 4 is a block diagram showing the configuration of the body unit (2) (sometimes denoted by (200)) in the digital camera system which is the first embodiment of the camera system according to the present invention.

Light from a subject enters the single-focus interchangeable lens unit (100) through a lens group (107), and is converted into an electric signal by an imaging device (108). Then, an AFE (109) amplifies the electric signal and converts the electric signal into a digital signal (imaging data). On the imaging data in the form of the digital signal, a main CPU (103) (image engine) in the single-focus interchangeable lens unit (100) performs a process including YUV conversion and conversion into JPEG image data or performs a RAW data file generation process. These processes are switched automatically based on the status of imaging operation, imaging mode settings, or the like.

The imaging data digitalized by the above image processing is sent to a main CPU (208) of the body unit (200) through a bidirectional bus (123) set in the main CPU (103) of the single-focus interchangeable lens unit (100), a joint connector (116) provided in the single-focus interchangeable lens unit (100), a joint connector (201) of the body unit (200), and then a bidirectional bus (223) of the body unit (200).

It is configured such that the widths of the bidirectional bus (123) of the main CPU (103) of the single-focus interchangeable lens unit (100) and the bidirectional bus (223) of the main CPU (208) of the body unit (200) can be changed at any time according to the amount of exchanged data by changing bus-width settings in the main CPUs (103), (203). This configuration allows processing contents to be distributed between the main CPU (103) of the single-focus interchangeable lens unit (100) and the main CPU (208) of the body unit (200) at any time. It is configured such that, regardless of the stage in the image processing (i.e., even for data in the middle of the image processing), image data can be exchanged at any time when necessary.

Reference numeral (114) denotes a Flash ROM in which to save a program for controlling the interchangeable lens unit and various pieces of setting information (setting items). Reference numeral (115) denotes a WORK RAM (DDR-SDRAM) for the main CPU (103) of the single-focus interchangeable lens unit (100).

Note that the setting information in the Flash ROM (114) of the single-focus interchangeable lens unit (100) is part or all of information pieces referred to in taking an image, and includes one or more than one of the setting items selected from a recording pixel count, an image compression rate, a focus mode, an exposure metering scheme, a noise removal setting, a white balance, and an ISO speed. Other setting items include an auto bracket, continuous shooting, exposure compensation, and the like. The setting information in the Flash ROM (114) of the single-focus interchangeable lens unit (100) includes preferably two or more, or more preferably all, of the setting items listed above. The same setting items as those in the Flash ROM (114) are saved in a Flash ROM (219) of the body unit (200), to be described later.

Reference numeral (111) denotes a motor driver of the single-focus interchangeable lens unit (100) for pulling in and out a lens tube. The main CPU (103) controls the motor driver (111), making the motor driver (111) control the pulling in and out of the lens tube by driving a motor (110). For certain types of the interchangeable lens unit (1), this mechanism allows the lens tube to be pulled in when the power is turned off or allows a zoom lens to perform magnification operation.

The single-focus interchangeable lens unit (100) also includes a gyro sensor (106) which detects an inclination of the digital camera and an acceleration sensor (112) which detects acceleration applied to the digital camera. The single-focus interchangeable lens unit (100) further includes a coil (105) which drives the lens group (107) based on the inclination detected by the gyro sensor (106) and the acceleration detected by the acceleration sensor (112), and a Hall element (104) which detects the drive amount of the coil (105). The gyro sensor (106), the acceleration sensor (112), the coil (105) and the Hall element (104) serve as a function for preventing camera-shake.

Reference numeral (121) denotes a control signal of the single-focus interchangeable lens unit (100), which is connected to a control signal (221) of the body unit (200). Reference numeral (122) is a serial interface signal of the single-focus interchangeable lens unit (100), which is connected to a serial interface signal (222) of the body unit (200) and can be used for exchange of control parameters between the main CPUs (103), (208). Reference numeral (124) is an SDIO signal of the single-focus interchangeable lens unit (100), which is connected to an SDIO signal (224) of the body unit (200) and is inputted to a general-purpose interface port of the main CPU (208) of the body unit (200).

A sub CPU (102) of the single-focus interchangeable lens unit (100) detects an electric power (120) supplied from the body unit (200), and controls a DC/DC (101) of the single-focus interchangeable lens unit (100) to thereby generate various power sources (electric powers) needed by the single-focus interchangeable lens unit (100).

Reference numeral (113) denotes an example of a circuit for detecting attachment of a teleconverter lens or a wide converter lens externally attachable to the single-focus interchangeable lens unit (100).

Reference numeral (211) denotes a shutter button provided to the body unit (200). Output of a cross key (206) used by a user making various settings is inputted to a sub CPU (205) of the body unit (200). The sub CPU (205) of the body unit (200) controls an electric power from a lithium ion battery (204) by using a DC/DC (203) of the body unit (200), and also controls a power switch (202) for the single-focus interchangeable lens unit (100).

Reference numeral (219) denotes a Flash ROM in which to save a program for activating and controlling the body unit (200) and various pieces of setting information. Reference numeral (220) is a WORK RAM (DDR-SDRAM) for the main CPU (208) of the body unit (200).

Reference numeral (216) denotes an audio codec IC mounted in the body unit (200), and sound can be acquired by a microphone (218) and can be outputted from a loudspeaker (217).

Reference numeral (214) denotes a USB interface connector, and reference numeral (213) denotes an AV-output interface connector.

Reference numeral (207) denotes a strobe circuit. Cameras of a certain body type have an external strobe terminal.

Reference numeral (210) denotes an LCD, as a display portion, which monitors and displays a subject image in focusing operation using the shutter button (211), and which displays data of a taken image in imaging operation.

Reference numeral (209) denotes an electrical view finder (EVF) through which a subject can be viewed without using the LCD (210).

Reference numeral (212) denotes an output interface for an HDMI signal, and reference numeral (215) denotes an SD memory as an attachable and detachable storage unit, in which a file of a taken image can be saved.

Second Embodiment of the Camera System

Figure 5:
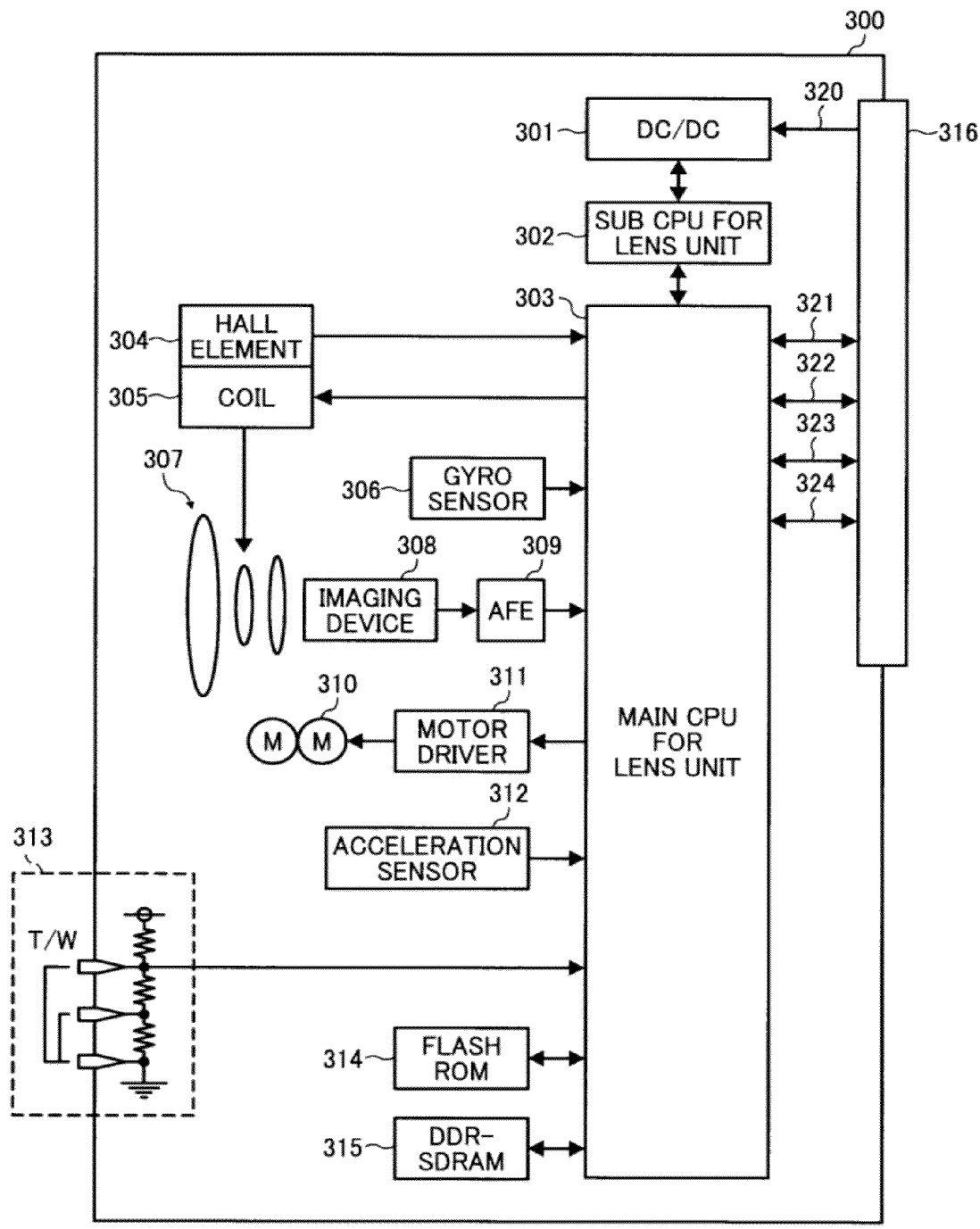
FIG. 5 is a block diagram showing the configuration of an interchangeable lens unit in a digital camera system which is a second embodiment of the camera system according to the present invention.

FIG. 5 is a block diagram showing the configuration of the interchangeable lens unit with optical zoom function (300) in a digital camera which is a second embodiment of the camera system according to the present invention. Note that the configuration of the body unit (200) in the present invention is the same as that in the first embodiment, and is therefore not described here.

The present embodiment is characterized in that the interchangeable lens unit with optical zoom function (300) has a zoom monitor (310) to enable an optical zoom function. Other components that are the same as those of the first embodiment are not described here.

Third Embodiment of the Camera System

Figure 6:
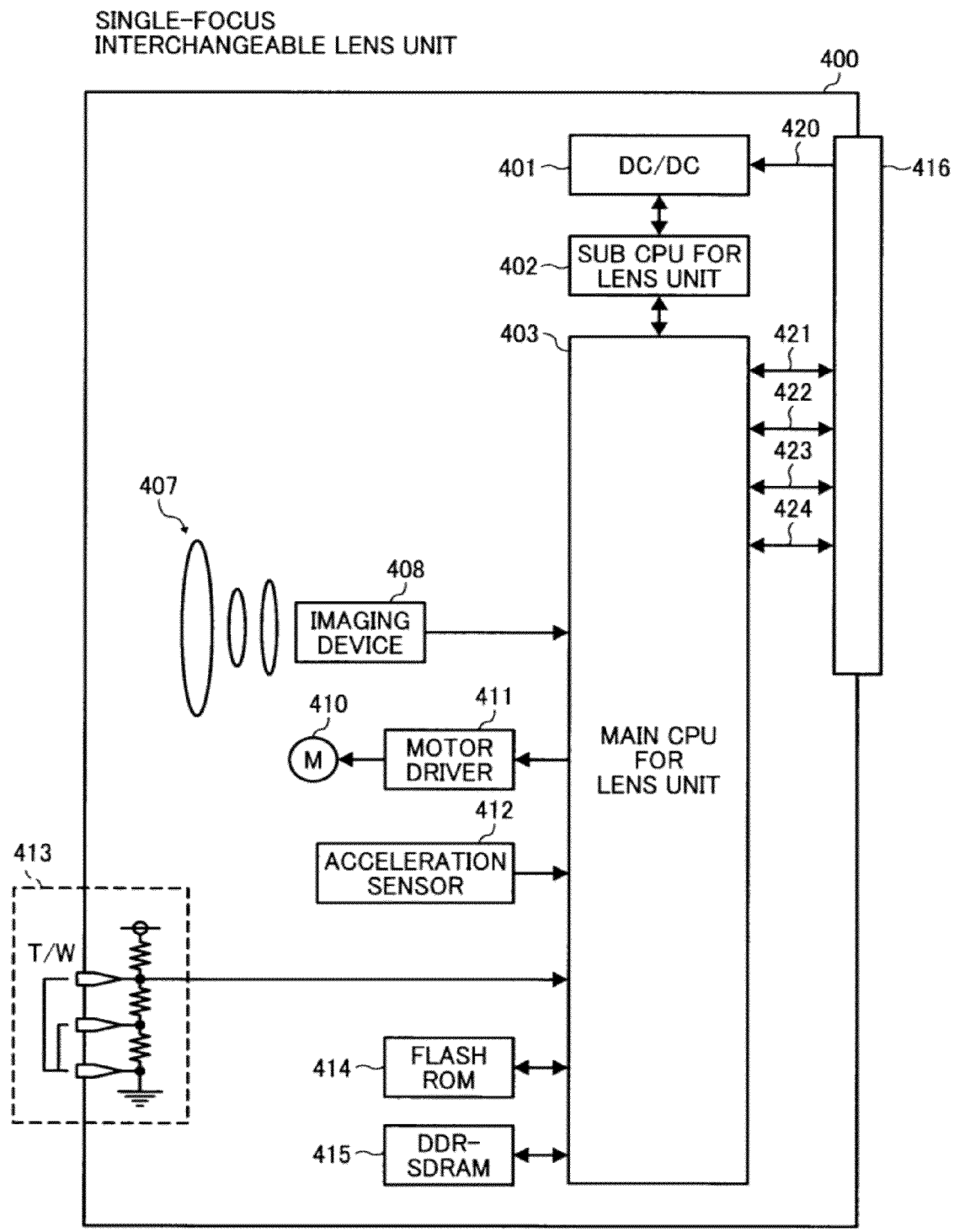
FIG. 6 is a block diagram showing the configuration of an interchangeable lens unit in a digital camera system which is a third embodiment of the camera system according to the present invention.

FIG. 6 is a block diagram showing the configuration of the interchangeable lens unit (1) in a digital camera system which is a third embodiment of the camera system according to the present invention. In the present embodiment, the interchangeable lens unit (1) is a single-focus interchangeable lens unit (400) using a large imaging device and having a circuit configuration similar to that in the single-focus interchangeable lens unit (100). Note that the configuration of the body unit (200) in the present invention is the same as that in the first embodiment, and is therefore not described here.

A configuration of the present embodiment using a large imaging device makes it difficult to move the imaging device with a camera-shake correction mechanism. For this reason, the single-focus interchangeable lens unit (400) does not include the gyro sensor, the acceleration sensor, the coil, and the Hall element. Note, however, that the present invention is not limited to such a mode, and may have both the large imaging device and the camera-shake correction mechanism. Note that other components that are the same as those of the first embodiment are not described here.

[Saving of and Reference to the Setting Information]

Next, a detail description is given below of saving of and reference to (or use of) the setting information referred to in taking an image. Various pieces of setting information are usually saved in the Flash ROM (219) of the body unit (200) shown in FIG. 3. The present invention is characterized by saving the setting information in the interchangeable lens units (1), as well. Note that it is technically possible to save the setting information of all the interchangeable lens units (1) in the Flash ROM (219) of the body unit (200) and to save no setting information in the interchangeable lens units (1). This is, however, not practical due to the following reasons. Specifically, since all pieces of setting information of the attachable interchangeable lens units (1) (including initial values of the setting information) have to be saved in the Flash ROM (219) of the body unit (200), the volume of the Flash ROM (219) increases, and every time a new interchangeable lens unit (1) is placed on sale, the user has to update the body unit (200) to have information on that interchangeable lens unit (1).

Accordingly, when the single-focus interchangeable lens unit (100) is coupled to the body unit (200), setting information on the single-focus interchangeable lens unit (100) is saved not only in the Flash ROM (219) of the body unit (200), but also in the Flash ROM (114) of the single-focus interchangeable lens unit (100). Further, when the interchangeable lens unit with optical zoom function (300) is used, setting information thereon is saved also in the Flash ROM (314) of the interchangeable lens unit with optical zoom function (300), as well, and when the single-focus interchangeable lens unit (400) is used, setting information thereon is saved in the flash memory (414) of the single-focus interchangeable lens unit (400), as well.

In any case, when setting information is to be saved in the Flash ROM (219) of the body unit (200), the same setting information as that saved in the body unit (200) is also saved in the interchangeable lens unit (1) which is currently coupled to the body unit (200).

Next, how to use the setting information saved in the interchangeable lens unit (1) is described. A possible method for saving setting information in both of the body unit (2) and the interchangeable lens unit (1) is to provide a function for explicitly prompting a user to perform saving operation on a menu screen or the like. This method, on one hand, allows the setting information to be saved reliably by the user operation, but on the other hand, is cumbersome, requiring the saving operation. An example of a method which allows a user to save setting information reliably without particular awareness and to selectively designate, during the use of the camera system, either the interchangeable lens unit (1) or the body unit (2) according to the purpose is to save the setting information in Flash ROMs of both of the body unit (2) and the interchangeable lens unit (1) every time the power is turned off. As a specific example, there is a method in which the setting information is saved in the Flash ROM (219) of the body unit (2) in the body unit (2) and the setting information is saved in the Flash ROM (114) of the interchangeable lens unit (1) in the interchangeable lens unit (1). In this case, the setting information at the time of the power off is saved in both the Flash ROM (114) of the interchangeable lens unit (1) and the Flash ROM (219) of the body unit (2). Accordingly, even if the interchangeable lens unit (1) is changed with another lens unit while the power is being off and is reattached to the body unit (2) to be used again, the latest setting information used when the interchangeable lens unit (1) was attached can be used.

Even if setting information is saved in the interchangeable lens unit (1), regardless of the type of the interchangeable lens unit (1) to use, a user may want to use setting information common to all the interchangeable lens units (1) or may want to use setting information saved for that interchangeable lens unit (1), depending on the purpose of using the imaging apparatus. To accomplish such a purpose, for example, a function for choosing a source from which to read a parameter as setting information of the body unit (2) is provided. At least a "body unit" and an "interchangeable lens unit" are necessary as those choices. For example, the choices are displayed as a selectable menu screen on the LCD (30) of the body unit (11) illustrated in FIG. 2. When the "body unit" is chosen by pressing the menu button (34) provided in the operation section (32) of the body unit (11), the setting information is read from the Flash ROM (219) of the body unit (2). When the "interchangeable lens unit" is chosen, setting information is read from the Flash ROM of the interchangeable lens unit (1) currently coupled (any one of (114), (314), and (414)). The setting information includes one or more than one of the setting items selected from the recording pixel count, the image compression rate, the focus mode, the exposure metering scheme, the noise removal setting, the white balance, and the ISO speed. It is possible to select the use (reference) of the setting information of the "body unit" or the setting information of the "interchangeable lens unit" regarding each setting item on the menu screen.

As another option, a function for choosing a read destination to which to read a parameter may be provided. Specifically, in this method, in reading setting information from the Flash ROM at the time of activation or the like, read destinations are displayed on a screen to allow one of them to be chosen on this screen. In this way, a function for appropriately choosing a read destination every time the interchangeable lens unit (1) is attached can be provided.

As described, the following functions can be provided. Specifically, to save setting information, the setting information is saved without choosing a save destination with particular awareness, and to use the setting information, the setting information is read from a read destination chosen according to the needs at that time.

In addition, the interchangeable lens units may have different applicable ranges for a certain function. For example, this is a case where an interchangeable lens unit B does not have an option that an interchangeable lens unit A has. More specifically, this is a case where "the performance of the interchangeable lens unit A>the performance of the interchangeable lens unit B," and setting information which the interchangeable lens unit B cannot implement is saved in the Flash ROM thereof. If the interchangeable lens unit B is used with such setting information being saved in the Flash ROM (219) of the body unit (200), the setting information saved in the Flash ROM (219) of the body unit (200) is not applicable to the interchangeable lens unit B. The determination whether or not the setting information is applicable to the interchangeable lens unit is performed by conducting a control program saved in the Flash ROM (219) of the body unit, for example. In this case, to perform operation corresponding to this setting information, an initial value of the setting information of the interchangeable lens unit B saved in the interchangeable lens unit B is referred, and is temporarily applied (set) to the DDR-SDRAM (220) of the body unit, to be activated. Then, a function (unit) is provided, which makes information thus used temporarily be written neither in the Flash ROM (114) of the interchangeable lens unit (100) nor in the Flash ROM (219) of the body unit (200) when the power is turned off. This provides such an effect that, when the interchangeable lens unit A is used thereafter, setting information previously set for the interchangeable lens unit A can be used. Note that the initial value of setting information refers to setting information that each interchangeable lens unit has in an initial (unused) state.

Further, when setting information is temporarily used, a display method may be adopted, which allows a user to see, when the setting information is displayed on a menu, that the setting information is being temporarily used. Possible examples of such a display method include highlighting the information by changing its display color or by making it bold, displaying a special icon, and the like. This provides such an effect that the user can see, on the menu screen, whether the setting information is to be saved or not when the power is turned off.

On the other hand, there is a possible case in which a user wants to intentionally save such temporarily-used setting information which is normally not saved. An example of a method for meeting such a demand is to save the setting information when some change is made on the setting information on the menu screen. This prevents a user's unintentional change on setting information from replacing the current setting information and saved without the user knowing it. Further, the above method provides such an effect that a user's intentional change on setting information is reliably saved.

Note that there is also a method in which setting temporarily-used information is saved in the Flash ROM (114) of the interchangeable unit (100) and the Flash ROM (219) of the body unit (200). In this case, setting information used last is always saved, providing an effect in terms of simplicity. Moreover, if the body unit (2) has a function such as a so-called custom setting saving function for collectively saving particular pieces of setting information, or a my menu registration, the following method can be adopted. Specifically, for a regular imaging menu, temporary setting information (setting information changed) is saved, and particular setting information saved by the custom setting saving function or registered in my menu is not overwritten unless an intentional saving operation is performed. This method provides two effects: simplicity because setting information is always saved in a regular case, and security because particular setting information which the user has intentionally saved is not overwritten carelessly.

For some users, certain setting information should be used commonly by multiple interchangeable lens units, and certain setting information should be changed depending on the interchangeable lens unit to use. For example, this is a case in which a user wants to use an aperture priority mode as an imaging mode for all the interchangeable lens units, but wants to use values different among the interchangeable lens units for the size or the aspect ratio of a recoding screen. A possible reason for using such a method is that the user wants to use the same imaging style, namely the aperture priority mode, for all the interchangeable lens units, but wants to record an image in a different, optimum format for each of the interchangeable lens units. An opposite method is possible, which uses the same size or aspect ratio of a recording image for all the interchangeable lens units, but changes the imaging mode depending on the interchangeable lens unit. A possible reason for using such a method is that the user wants to have the same file format for a particular purpose, but wants to use an optimal imaging mode or the like which is suitable for the characteristics of the interchangeable lens unit to use. In this way, a user may want to save different setting information in each of the body unit and the interchangeable lens unit, depending on the purpose of the imaging. A possible way to deal with such situation is to provide a unit (the setting information determination unit) for determining which setting information, namely, one saved in the interchangeable lens unit or one saved in the body unit, to use as setting information. This provides such an effect that setting information can be saved and used in an optimum way according to the situation in which the camera system is used.

The embodiments of the present invention described above allow a user to perform easy-to-handle, fuss-free setting of information in an interchangeable-lens camera system, even when multiple interchangeable lens units are used.

The embodiments of the present invention can provide the camera system with an interchangeable lens unit having an imaging device, the method for controlling the camera system, and the body unit used in the camera system. Specifically, the camera system allows a user to perform easy-to-handle, fuss-free setting of setting information necessary for shooting even when multiple interchangeable lens units are used.

Although the embodiments of the present invention have been described above, the present invention is not limited thereto. It should be appreciated that variations may be made in the embodiments described by persons skilled in the art without departing from the scope of the present invention.

What is claimed is:

1. A camera system comprising;
   an interchangeable lens unit including an optical lens and an imaging device for taking an image of light from a subject having passed through the optical lens;
   a body unit to and from which the interchangeable lens unit is attachable and detachable;
   a setting information saving unit which is provided in each of the interchangeable lens unit and the body unit and saves part or all of pieces of setting information referred to in taking an image;
   a setting information choosing unit which chooses setting information to refer to, from the setting information saved in the interchangeable lens unit and the setting information saved in the body unit; and
   a setting information determination unit which determines whether or not the setting information saved in the body unit is applicable to the interchangeable lens unit, wherein
   when the setting information choosing unit chooses the setting information saved in the body unit, if the setting information determination unit determines that the setting information saved in the body unit is not applicable to the interchangeable lens unit, the setting information saved in the body unit is set in a memory provided in the body unit by referring to an initial value of the setting information saved in the interchangeable lens unit.

2. The camera system according to claim 1, wherein
   the setting information includes information on at least one of setting items selected from a recording pixel count, an image compression rate, a focus mode, an exposure metering scheme, a noise removal setting, a white balance, and an ISO speed.

3. The camera system according to claim 2, wherein
   the setting information includes two or more setting items, for each of the two or more setting items, the setting information choosing unit chooses setting information to refer to, from setting information saved in the interchangeable lens unit and setting information saved in the body unit, and
   in the setting item which is chosen to refer to the setting information saved in the body unit by the setting information choosing unit, if the setting information determination unit determines that the setting information saved in the body unit is not applicable to the interchangeable lens unit, the setting information saved in the body unit is set in a memory provided in the body unit by referring to an initial value of the setting information saved in the interchangeable lens unit for the chosen setting item.

4. The camera system according to claim 1, wherein
   the setting information saving unit saves the same setting information to each of the interchangeable lens unit and the body unit.

5. The camera system according to claim 1, wherein the setting information saving unit saves the setting information when the camera system ends system operation.

6. The camera system according to claim 5, wherein
   when an image is taken using particular setting information, the setting information saving unit does not save the setting information when the camera system ends system operation.

7. The camera system according to claim 1, wherein when the initial value of the setting information is referred to, the setting information saving unit does not save the setting information.

8. A body unit used in the camera system according to claim 1.

9. A method for controlling a camera system comprising:
   an interchangeable lens unit including an optical lens and an imaging device for taking an image of light from a subject having passed through the optical lens;
   a body unit to and from which the interchangeable lens unit is attachable and detachable;
   a setting information saving step which is provided in each of the interchangeable lens unit and the body unit and saves part or all of pieces of setting information referred to in taking an image;
   a setting information choosing step which chooses setting information to refer to, from the setting information saved in the interchangeable lens unit and the setting information saved in the body unit; and
   a setting information determination step which determines whether or not the setting information saved in the body unit is applicable to the interchangeable lens unit, wherein
   when the setting information choosing step chooses the setting information saved in the body unit, if the setting information determination step determines that the setting information saved in the body unit is not applicable to the interchangeable lens step, the setting information saved in the body unit is set in a memory provided in the body unit by referring to an initial value of the setting information saved in the interchangeable lens unit.

10. The method for controlling a camera system according to claim 9, wherein
    the setting information includes information on at least one of setting items selected from a recording pixel count, an image compression rate, a focus mode, an exposure metering scheme, a noise removal setting, a white balance, and an ISO speed.

11. The method for controlling a camera system according to claim 10, wherein
    the setting information includes two or more setting items, for each of the two or more setting items, the setting information choosing step chooses setting information to refer to, from setting information saved in the interchangeable lens unit and setting information saved in the body unit, and in the setting item which is chosen to refer to the setting information saved in the body unit by the setting information choosing step, if the setting information determination step determines that the setting information saved in the body unit is not applicable to the interchangeable lens unit, the setting information saved in the body unit is set in a memory provided in the body unit by referring to an initial value of the setting information saved in the interchangeable lens unit for the chosen setting item.

12. The method for controlling a camera system according to claim 9, wherein the setting information saving step saves the same setting information to each of the interchangeable lens unit and the body unit.

13. The method for controlling a camera system according to claim 9, wherein, in the setting information saving step, the setting information is saved when the camera system ends system operation.

14. The method for controlling a camera system according to claim 13, wherein, when an image is taken using particular setting information, in the setting information saving step, the setting information is not saved when the camera system ends system operation.

15. The method for controlling a camera system according to claim 9, wherein when the initial value of the setting information is referred to, the setting information is not set in the setting information saving step.

* * * * *